R. COLLING.
MUSICAL INSTRUMENT.
APPLICATION FILED AUG. 27, 1918.

1,312,614.

Patented Aug. 12, 1919.

INVENTOR
RALPH COLLING

WITNESS
Bradley L. Benson
John R. Borden

UNITED STATES PATENT OFFICE.

RALPH COLLING, OF SAN FRANCISCO, CALIFORNIA.

MUSICAL INSTRUMENT.

1,312,614.  Specification of Letters Patent.  Patented Aug. 12, 1919.

Application filed August 27, 1918. Serial No. 251,607.

*To all whom it may concern:*

Be it known that I, RALPH COLLING, a citizen of the United States, residing at San Francisco, in the county of San Francisco and State of California, have invented a new and useful Musical Instrument, of which the following is a specification.

My invention relates to improvements in devices wherein sound is produced by directing a current of air against the edge of an elastic membrane. The objects of my invention are to provide a device of this class by means of which one may produce tones of pleasing quality, and by means of which melodies may be played with ease, devices of this kind having heretofore been of the nature of toys. I attain these objects by means illustrated in the accompanying drawings, which form a part of this specification.

Figure 1:
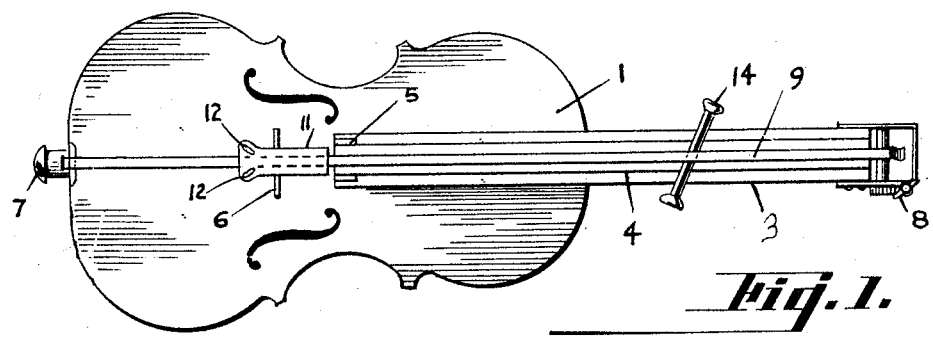
Figure 2:
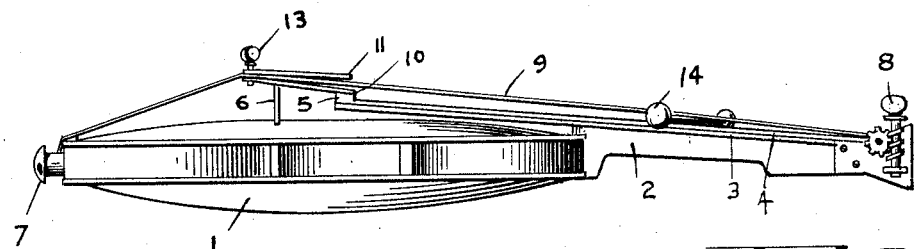
Figure 3:
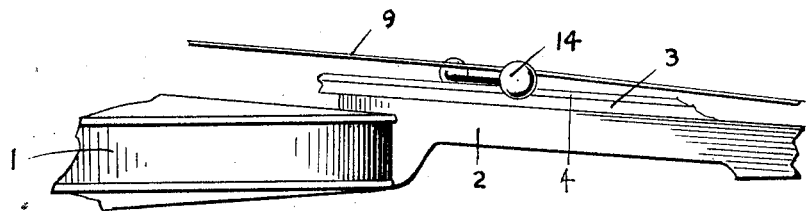
Figure 4:
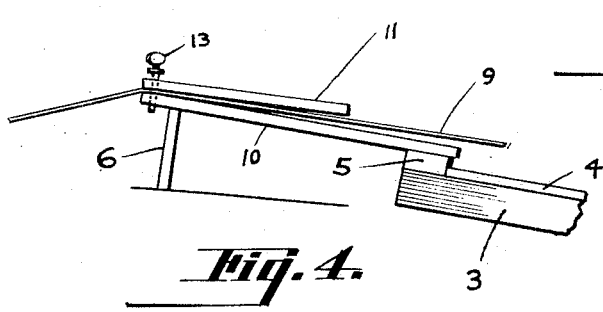

Figure 1 is a plan view of my device. Fig. 2 is a side elevation. Fig. 3 is a side view of membrane with stop and stop-rest. Fig. 4 is an enlarged view of adjustable mouthpiece.

Like numerals refer to like parts in the several views.

9 is an elastic membrane, preferably of india rubber, which is attached to and stretched from the tail-peg 7, at one end of the resonance-body 1. The membrane 9 passes between parts 10 and 11, which two parts together form a mouthpiece. The membrane 9 rests upon the end of part 10 nearest the tail-peg 7, and said part 10 is supported rigidly above the resonance-body 1 by means of the bridge 6 and support 5. The membrane 9 passes over and above the stop-rest 4, thence through a slit in tuning-peg 8. By means of the tuning-peg the membrane is tuned in a manner similar to any stringed musical instrument.

The major portion of the mouthpiece 10 and 11 extends from the bridge 6 in the direction of the stop-rest 4. The minor portion of the mouthpiece, extending from the bridge in the opposite direction, is of greater width, and provided with screw-passages 12 and adjusting-screws 13. The two parts 10 and 11 of the mouthpiece are beveled slightly where they contact with the membrane 9, so that the mouthpiece has the form of a narrow wedge or letter V. The adjusting-screws 13 hold the parts 10 and 11 in position and allow a delicate adjustment of tension of the edges of the membrane 9.

The stop-rest support 3 is connected to the resonance-body 1 by means of the neck 2, and carries upon its upper surface the stop-rest 4 having a smooth and hard surface. 14 is a movable stop, preferably of glass, placed between and in contact with the stop-rest 4 and the membrane 9, the position of the stop 14 relative to the length of the membrane 9 determining the musical pitch of said membrane.

It is necessary that the portion of the membrane 9 passing between the parts 10 and 11 of the mouthpiece be maintained at an equal distance from each of said parts 10 and 11. If the membrane 9 were rigid, then if the plane of the length of the membrane were parallel to the plane of the length of stop-rest 4, any position of the stop 14 along the length of the membrane would allow the proper relation of the membrane to the mouthpiece. But since the flexibility of the membrane increases as its length increases, and a certain degree of pressure of the membrane upon the movable stop is needed, the membrane must therefore be stretched at an angle to the direction of the length of the stop-rest, as shown in Figs. 2 and 3.

To perform upon the instrument, the body is held in one hand, the narrow middle portion of a violin body being adapted to fit into the hand, and the movable stop is held between the thumb and forefinger of the other hand. The stop glides easily along the stop-rest, enabling rapid transition from one note to another.

A proper adjustment of the screws 13 permits the same quality and power of tone to be produced when inhaling the breath as when exhaling. If the movable stop 14 be held at the angle shown in Fig. 2 when exhaling the breath, a loud tone is more easily produced. And in like manner, a loud tone is more easily produced when inhaling the breath if the stop be held at the angle shown in Fig. 3.

I contend that my invention more nearly approaches the expressiveness of the human voice than any other instrument yet devised.

It is obvious that deviations might be made from the exact construction shown in the accompanying drawings without departing from my invention. I claim and desire to secure by Letters Patent:

1. In a musical instrument, a stretched membrane of elastic material, having a portion of its length embraced by an adjustable mouthpiece consisting of two labial parts lying along opposite sides of said portion of membrane, one end of each labial part in contact with said membrane and extending therefrom at such an angle to the direction of the length thereof that said mouthpiece has the form of a letter V, the contact ends of said labial parts extended in width and provided with screw-passages and adjusting-screws for the purpose set forth.

2. In a musical instrument, the combination of a stretched membrane of elastic material, a mouthpiece embracing a portion of the length thereof, a stop-rest, having a smooth and hard surface, in position beneath a lateral surface of and in a plane nearly parallel to the length of said membrane, the separate planes of said membrane and said stop-rest tending to converge as their distances from said mouthpiece increase, and a stop adapted to be moved with ease between and in contact with said membrane and said stop-rest.

3. In a musical instrument, a stretched membrane of elastic material, in combination with an adjustable mouthpiece consisting of two labial parts lying along opposite sides of said membrane for a portion of the length thereof, one end of each said labial part in contact with said membrane and extending therefrom at such an angle to the direction of the length thereof that said mouthpiece has the form of a V, the contact ends of said labial parts extended in width and provided with screw passages and adjusting-screws for the purpose set forth, a stop-rest, having a smooth and hard surface, in position beneath a lateral surface of and in a plane nearly parallel to the length of said membrane, the separate planes of said membrane and said stop-rest tending to converge as their distances from said mouthpiece increase, and a stop adapted to be moved with ease between and in contact with said membrane and said stop-rest.

4. In a musical instrument, the combination of a stretched membrane or elastic material, a mouthpiece embracing a portion of the length thereof, a stop-rest having a smooth and hard surface in position beneath a lateral surface of and in a plane nearly parallel to the length of said membrane, the separate planes of said membrane and said stop-rest tending to converge as their distances from said mouthpiece increase, a stop adapted to be moved with ease between and in contact with said membrane and said stop-rest, a resonance-body, means, substantially as described, for supporting said membrane in combination with said mouthpiece and said stop-rest upon and in proper relation to said resonance-body, and a tuning-peg having a longitudinal split therein.

5. In a musical instrument, a stretched membrane of elastic material, in combination with an adjustable mouthpiece consisting of two labial parts lying along opposite sides of said membrane for a portion of the length thereof; one end of each said labial part in contact with said membrane and extending therefrom at such an angle to the direction of the length thereof that said mouthpiece has the form of a V, the contact ends of said labial parts extended in width and provided with screw-passages and adjusting screws for the purpose set forth, a stop-rest having a smooth and hard surface in position beneath a lateral surface of and in a plane nearly parallel to the length of said membrane, the separate planes of said membrane and said stop-rest, a resonance-body, as their distances from said mouthpiece increase, a stop adapted to be moved with ease between and in contact with said membrane and said stop-rest, a resonance-body, means, substantially as described, for supporting said membrane in combination with said mouthpiece and said stop-rest upon and in proper relation to said resonance-body, and a tuning-peg having a longitudinal slit therein.

RALPH COLLING.

Witnesses:
VIOLET AUGUST,
JOHN R. BORDEN.

Copies of this patent may be obtained for five cents each, by addressing the "Commissioner of Patents, Washington, D. C."